(12) United States Patent
Kao

(10) Patent No.: US 6,345,572 B1
(45) Date of Patent: Feb. 12, 2002

(54) SOYBEAN MILK MAKER

(76) Inventor: Young-Tsung Kao, No. 9, Lane 37, Art Chung Rd., Tainan City (TW)

( * ) Notice: Subject to any disclaimer, the term of this patent is extended or adjusted under 35 U.S.C. 154(b) by 0 days.

(21) Appl. No.: 09/853,464

(22) Filed: May 14, 2001

(51) Int. Cl.[7] ............................. A23C 3/02; A23L 1/00; A23L 1/20; A47J 43/044; B01F 7/20
(52) U.S. Cl. ........................... 99/337; 99/281; 99/285; 99/286; 99/288; 99/348; 99/453; 99/456; 99/483; 99/510; 366/146; 366/249; 366/251
(58) Field of Search ..................... 99/275, 279–281, 99/283, 285, 286, 288, 290, 300, 323.3, 331, 337, 338, 341, 348, 452–455, 456–460, 468, 483, 485, 495, 509–513; 426/43–46, 50, 52, 61, 656, 431, 520, 598; 210/346, 511, 514, 694, 780, 793; 366/279, 144–146, 249–251

(56) References Cited

U.S. PATENT DOCUMENTS

| | | | | |
|---|---|---|---|---|
| 2,517,073 A | * | 8/1950 | Alvarez | 99/286 X |
| 2,827,845 A | * | 3/1958 | Richeson | 99/287 X |
| 3,871,273 A | * | 3/1975 | Hsieh | 99/286 |
| 4,534,283 A | * | 8/1985 | Nakamuta | 99/468 |
| 4,771,681 A | * | 9/1988 | Nagata | 99/453 X |
| 4,817,516 A | * | 4/1989 | Chikarashi | 99/483 |
| 4,996,916 A | * | 3/1991 | Miyawaki et al. | 99/453 |
| 5,058,494 A | * | 10/1991 | Hayashi et al. | 99/483 X |
| 5,109,759 A | * | 5/1992 | Asahara | 99/511 X |
| 5,249,513 A | * | 10/1993 | Ueda | 99/459 X |
| 5,363,753 A | * | 11/1994 | Ueda et al. | 99/453 |
| 5,669,291 A | * | 9/1997 | Kazuyoshi | 99/452 X |
| 5,701,810 A | * | 12/1997 | Nakai | 210/514 X |

* cited by examiner

Primary Examiner—Timothy F. Simone
(74) Attorney, Agent, or Firm—Charles E. Baxley, Esq.

(57) ABSTRACT

A soybean milk maker comprises a main body having an upper opening and a cover releasably mounted to the upper opening of the main body. The cover includes a passage having an upper end communicated with outside and a lower end. A filter/receiver is mounted in the main body and attached to the cover. The lower end of the passage is communicated with the filter/receiver. The passage is provided for adding soybeans and water into the filter/receiver. A power device mounted in the cover. A driving shaft is mounted in the filter/receiver and has an upper end operably connected to and thus driven by the power device and a lower end to which several blades are attached. A heating element is provided for heating soybean juice as a result of breaking the soybeans by the blades.

3 Claims, 4 Drawing Sheets

SOYBEAN MILK MAKER

BACKGROUND OF THE INVENTION

1. Field of the Invention

The present invention relates to a soybean milk maker, and more particularly to a household soybean milk maker with improved operational convenience and safety.

2. Description of the Related Art

FIG. 1 of the drawings illustrates a conventional soybean milk maker comprising a transparent main body 10, a cover 20 mounted to an open upper side of the main body 10, and a motor 30 mounted in a central portion of the main body 10. An output shaft 301 of the motor 30 is connected to a connecting portion 40 by force fitting. A cutter shaft 50 has an upper end force-fitted to the connecting portion 40 and a lower end to which a plurality of blades 60 are mounted. A sieve-like container 70 surrounds the cutter shaft 50 for receiving soybeans that have been pre-immersed for subsequent breaking. Soybean juice as a result of breaking the soybeans by the blades 60 is heated by a heating element 80. The boiled soybean juice is called soybean milk.

When making soybean milk, an amount of water is added into the sieve-like container 70 after an appropriate amount of soybeans has been placed into the container 70. Then, the cover 20 is mounted to the open upper side of the main body 10. However, the blades 60 will be impeded by the soybeans when mounting the cover 20. A solution is to shake the main body 10 and the container 70 to assist in moving the blades 60 through the soybeans to a position nearby the bottom of the container 70. A control panel on the cover 20 allows the user to preset the time for breaking the soybeans and the time for boiling the broken soybeans.

However, the cover 20 must be removed before adding soybeans and water, and it is inconvenient and troublesome to place the cover 20 in position, as the blades 60 will be impeded by the soybeans 60. In addition, it was found that the connecting portion 40 for interconnecting the output shaft 301 of the motor 30 and the cutter shaft 50 tends to malfunction after a period of time. Furthermore, caution must be taken so as not to touch the control panel on the cover during removal of the cover after making soybean milk.

SUMMARY OF THE INVENTION

It is the primary object of the present invention to provide a soybean milk maker with improved operational convenience and safety.

A soybean milk maker in accordance with the present invention comprises:

- a main body having an upper opening;
- a cover releasably mounted to the upper opening of the main body, the cover including a passage having an upper end communicated with outside and a lower end;
- a filter/receiver mounted in the main body and attached to the cover, the lower end of the passage being communicated with the filter/receiver, the passage being provided for adding soybeans and water into the filter/receiver;
- a power device mounted in the cover, a driving shaft mounted in the filter/receiver and having an upper end operably connected to and thus driven by the power device and a lower end to which a plurality of blades are attached; and
- a heating element for heating soybean juice as a result of breaking the soybeans by the blades.

The cover further comprises a hidden type safety switch such that an open circuit is formed when the cover is removed from the main body, thereby improving the operational safety. The driving shaft is an integral shaft to provide a reliable transmission The soybeans can be added into the soybean milk maker without removing the cover. The filter/receiver and the cover can be securely mounted together by turning the cover through an angle relative to the filter/receiver. A hidden type safety switch is mounted in the cover to prevent injury resulting from inadvertent touching of the control panel on the cover. The driving shaft to which the blades are mounted is an integral shaft extending from the power device mounted in the interior of the cover, thereby providing a reliable transmission.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
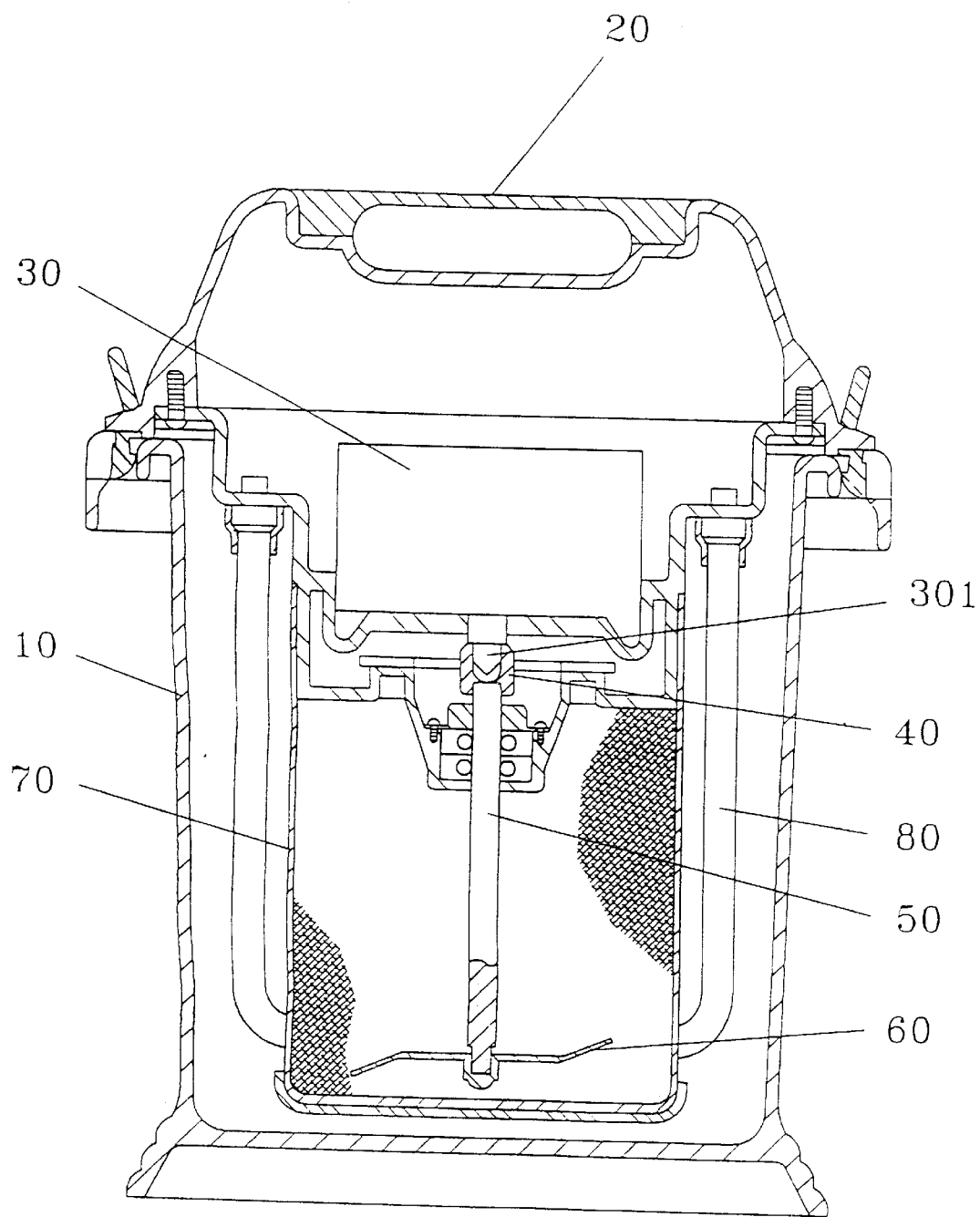
FIG. 1 is a sectional view of a conventional soybean milk maker.
Figure 2:
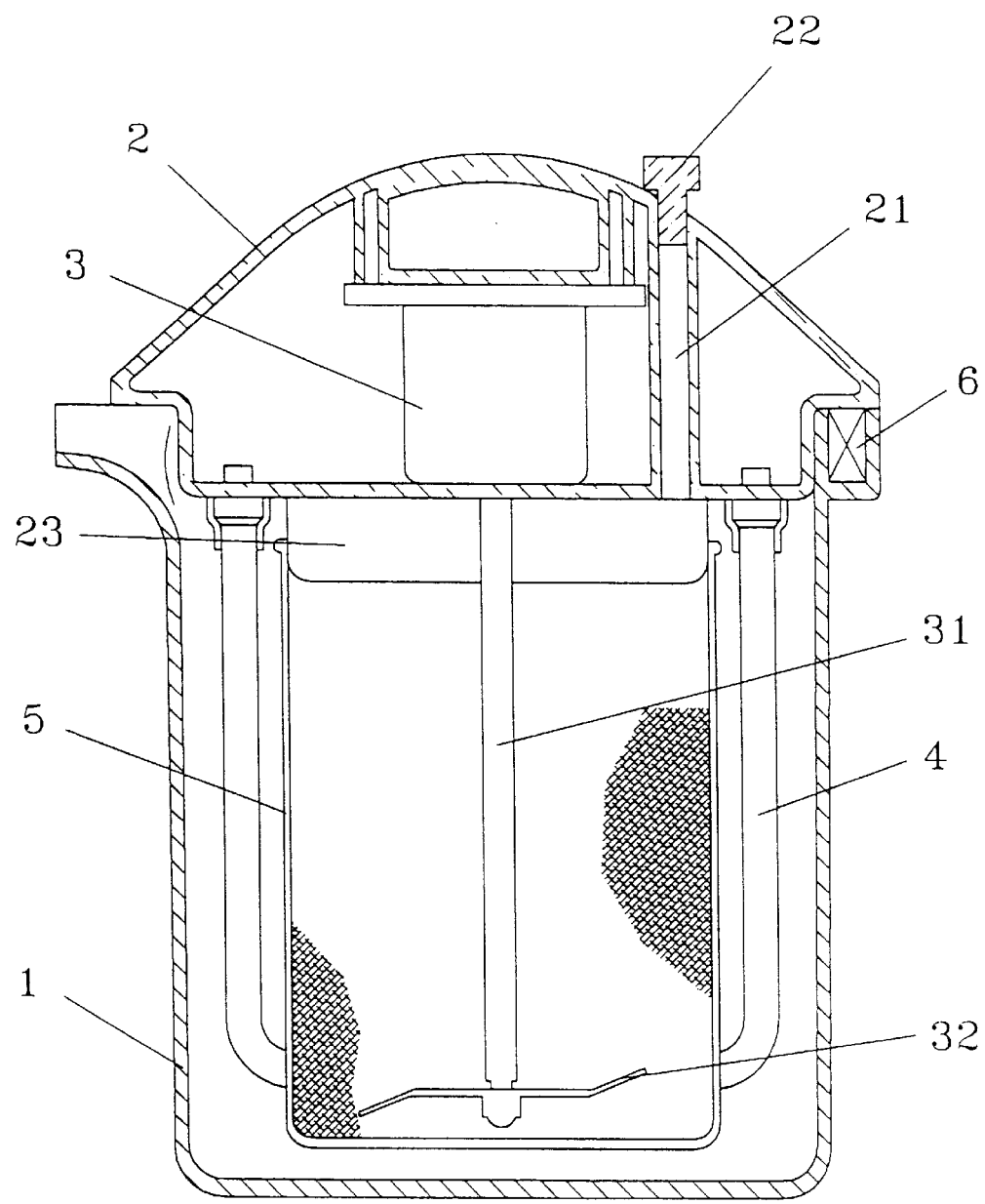
FIG. 2 is a sectional view of a soybean milk maker in accordance with the present invention.
Figure 3:
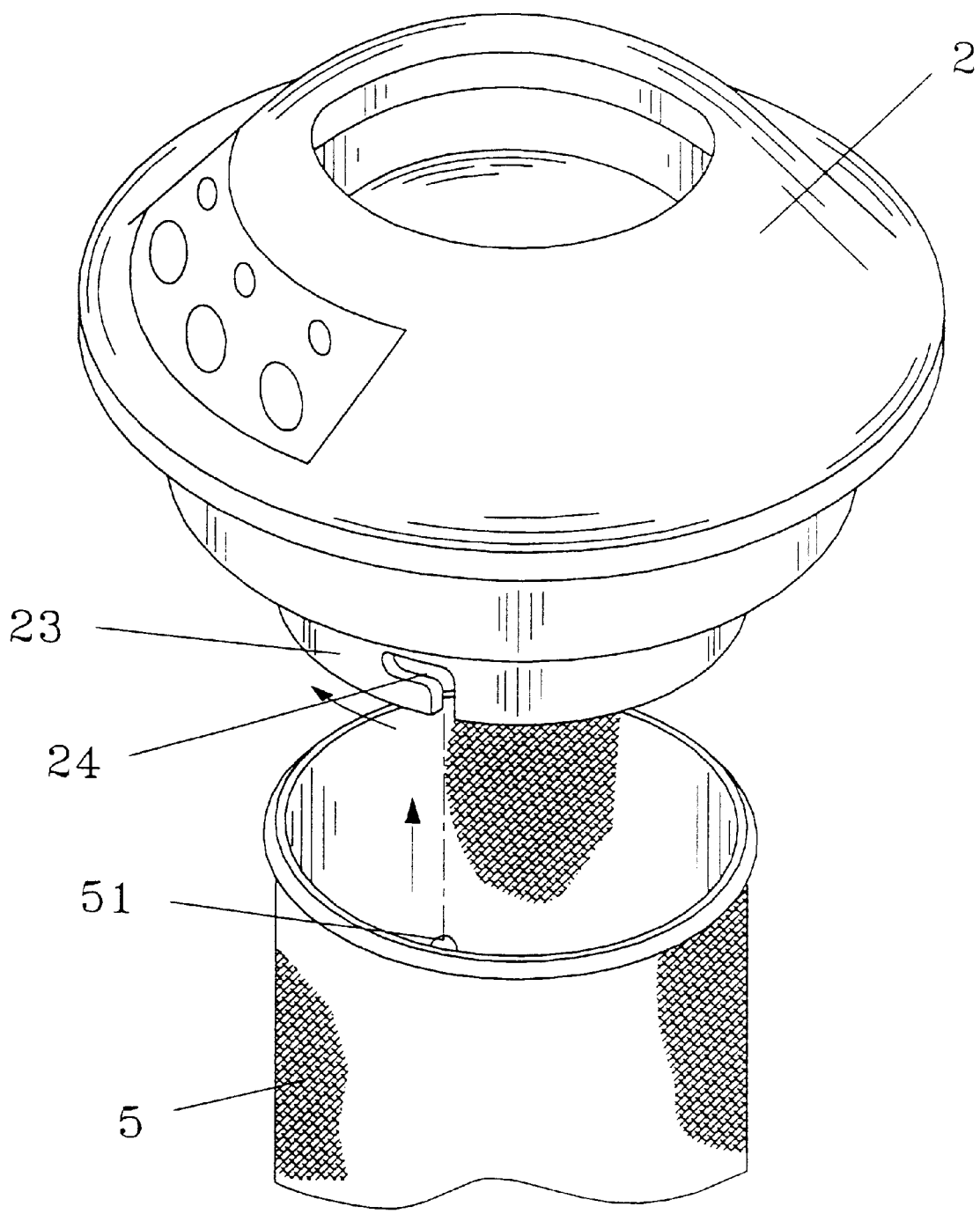
FIG. 3 is a partial perspective view of the soybean milk maker in accordance with the present invention.

Referring to FIGS. 2 and 3, a soybean maker in accordance with the present invention generally includes a main body 1, a cover 2, a power device 3, a heating element 4, and a filter/receiver 5. The main body 1 is transparent and includes an upper opening that is enclosed by the cover 2. The power device 3 is mounted in a central portion of the cover 2. The cover 2 includes a skirt 23 having a slanted L-shape notch 24. The filter/receiver 5 includes a protrusion 51 on a top edge thereof. Thus, the protrusion 51 is inserted into the notch 24 and the cover 20 is then turned through an angle until the protrusion 51 reaches an inner end of the L-shape notch 24. Thus, the cover 2 is securely engaged with the filter/receiver 5.

The heating element 4 is a substantially U-shape member having two ends securely attached to the cover 2, best shown in FIG. 2. It is noted that the heating element 4 is outside the filter/receiver 5 but inside the main body 1. A driving shaft 31 includes an upper end operably connected to the power device 3 in the cover 20 and a lower end to which a plurality of blades 32 are attached.

The cover 2 further includes a passage 21 having a lower end communicated with an interior of the filter/receiver 5 and an upper end communicated with outside. When not in use, a cap 22 or the like is used to block the passage 21.

Figure 4:
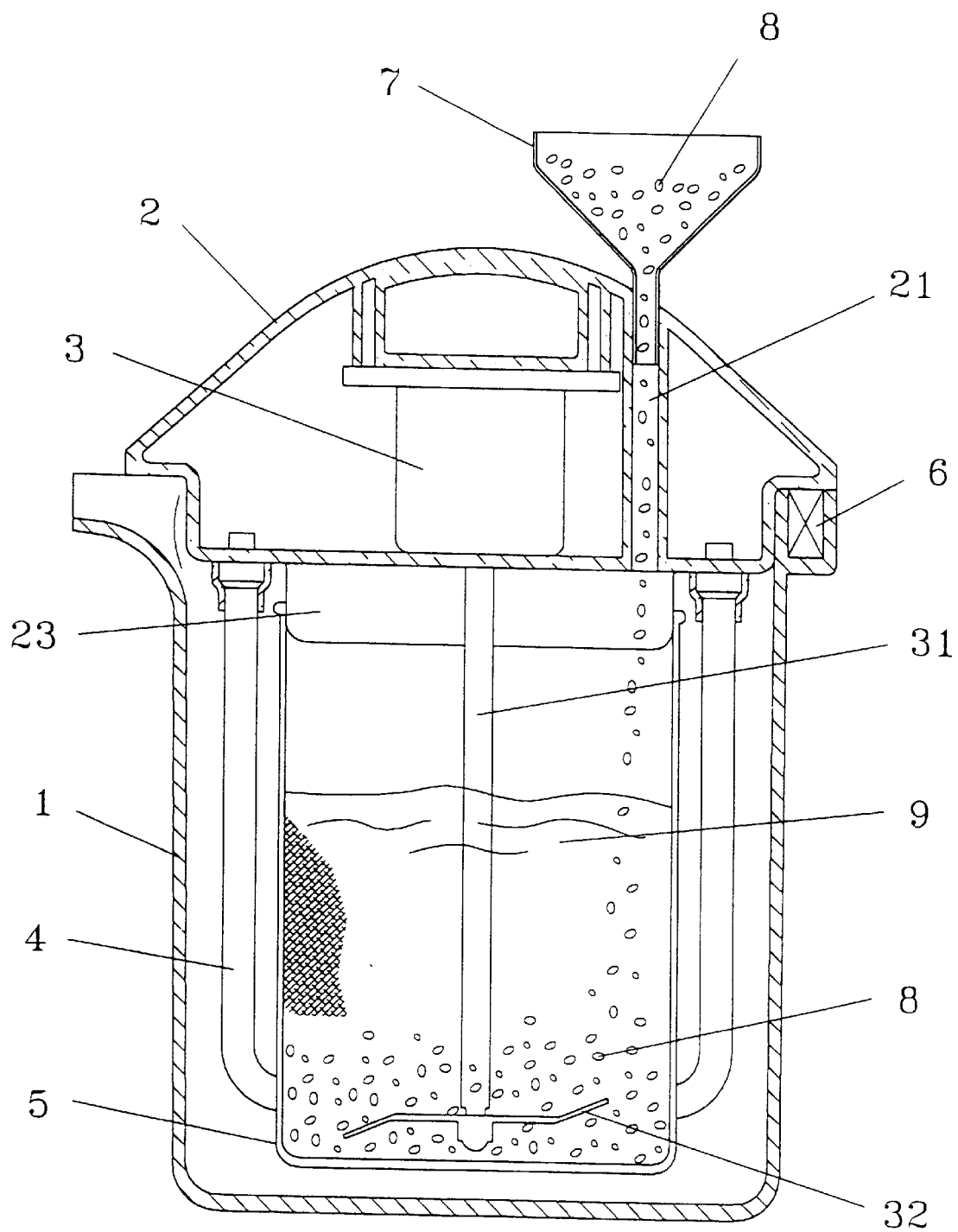
FIG. 4 is a sectional view similar to FIG. 2, illustrating adding of soybeans.

In use, referring to FIG. 4, the cap 22 is removed, and soybeans and water are added into the filter/receiver 5 via the passage 21. A hopper 7 may be used to guide the soybeans and water. Thus, the soybeans can be added into the soybean milk maker without the need of removing the cover 2. The user may preset the time for breaking soybeans by the blades 32 and the time for boiling the soybean juice. After the soybean milk is made, the user may remove the cover 2 and dispense the soybean milk via a spout (not labeled) of the main body 1. It is noted that the cover 2 includes a hidden type safety switch 6 mounted therein. When the cover 2 is removed from the main body 1, an open circuit is formed such that the blades 32 will not rotate even if the control panel on the cover 2 is inadvertently touched. Improved operational safety is thus provided.

According to the above description, it is appreciated that the soybeans can be added into the soybean maker without the need of removing the cover. In addition, the driving shaft 31 to which the blades 32 are mounted is an integral shaft that directly extends from the power device 3 mounted in the cover 2, which eliminates the problem of malfunction of the connecting portion 40 of the conventional soybean milk maker. Furthermore, the filter/receiver and the cover are securely mounted together. Moreover, the risk of potential injury resulting from inadvertent touching of the control panel when removing the cover after the soybean milk is made is prevented by means of the use of the hidden type safety switch.

Although the invention has been explained in relation to its preferred embodiment, it is to be understood that many other possible modifications and variations can be made without departing from the scope of the invention as hereinafter claimed.

What is claimed is:

1. A soybean milk maker comprising:

a main body having an upper opening;

a cover releasably mounted to the upper opening of the main body, the cover including a passage having an upper end communicated with outside and a lower end;

a filter/receiver mounted in the main body and attached to the cover, the lower end of the passage being communicated with the filter/receiver, the passage being provided for adding soybeans and water into the filter/receiver;

a power device mounted in the cover, a driving shaft mounted in the filter/receiver and having an upper end operably connected to and thus driven by the power device and a lower end to which a plurality of blades are attached; and a heating element for heating soybean juice as a result of breaking the soybeans by the blades.

2. The soybean milk maker as claimed in claim 1, wherein the cover further comprises a hidden type safety switch such that an open circuit is formed when the cover is removed from the main body.

3. The soybean milk maker as claimed in claim 1, wherein the driving shaft is an integral shaft.

* * * * *